No. 736,256. PATENTED AUG. 11, 1903.
F. V. HETZEL.
DRIVE CHAIN AND SPROCKET WHEEL THEREFOR.
APPLICATION FILED FEB. 5, 1903.
NO MODEL.

Witnesses:—
Frank L. A. Graham
Herman E. Metus

Inventor:—
Frederic V. Hetzel,
by his Attorneys
Howson & Howson

No. 736,256. Patented August 11, 1903.

UNITED STATES PATENT OFFICE.

FREDERIC V. HETZEL, OF PHILADELPHIA, PENNSYLVANIA, ASSIGNOR TO THE LINK BELT ENGINEERING COMPANY, OF PHILADELPHIA, PENNSYLVANIA, A CORPORATION OF PENNSYLVANIA.

DRIVE-CHAIN AND SPROCKET-WHEEL THEREFOR.

SPECIFICATION forming part of Letters Patent No. 736,256, dated August 11, 1903.

Application filed February 5, 1903. Serial No. 142,044. (No model.)

*To all whom it may concern:*

Be it known that I, FREDERIC V. HETZEL, a citizen of the United States, residing in Philadelphia, Pennsylvania, have invented certain Improvements in Drive-Chains and Sprocket-Wheels Therefor, of which the following is a specification.

The main object of my invention is to construct a drive-chain of the "silent" type, in which the links are open and detachable one from another.

A further object of my invention is to improve the construction of sprocket-wheel used in connection with the above-mentioned drive-chain.

Figure 1:
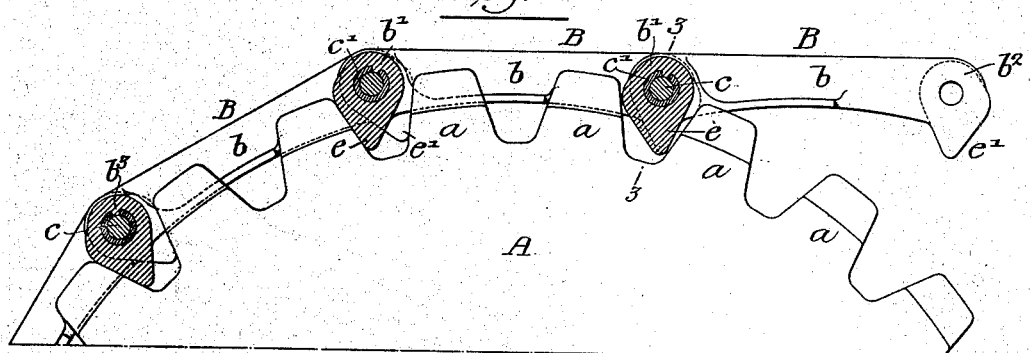
Figure 2:
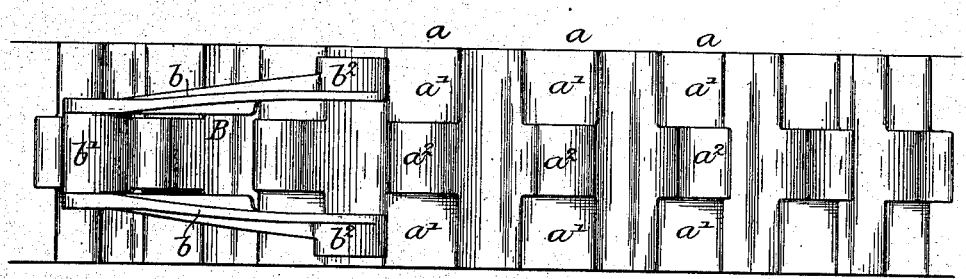
Figure 3:
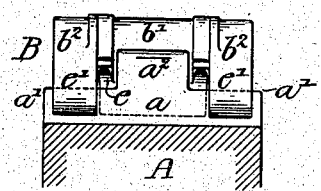
Figure 4:
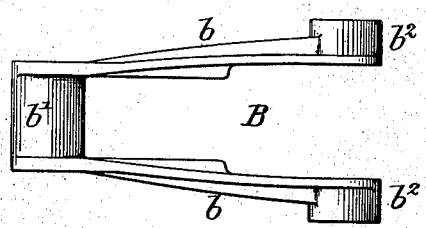
Figure 5:
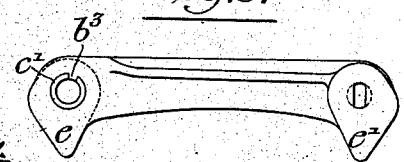

Referring to the accompanying drawings, Figure 1 is a longitudinal sectional view of a drive-chain, showing its relation to the sprocket-wheel. Fig. 2 is a plan view of part of the sprocket-wheel shown in Fig. 1 with one of the links of the chain in position, the other links being removed to avoid confusion. Fig. 3 is a section on the line 3 3, Fig. 1. Fig. 4 is a detached plan view of one of the links, and Fig. 5 is a detached side view of one of the links.

A is a sprocket-wheel having teeth $a$ extending from one side of the wheel to the other. These teeth are stepped, as shown, being lower at each side $a'$ than at the center $a^2$ for the purpose described hereinafter.

B B are the links of a drive-chain. Each link is made as shown in Figs. 4 and 5, having side members $b$ $b$, connected by an end member $b'$, in which is a socket for a pin. At the opposite end of each side member $b$ $b$ are sockets $b^2$, so that when the links are assembled the sockets $b'$ and $b^2$ are in line and are held by pins $c$. The socket $b'$ has a bushing $c'$, which is held from turning in the socket by a projection $b^3$ in the present instance. Extending from the socket $b'$ is a tapered tooth $e$, and extending from each of the sockets $b^2$ is a tapered tooth $e'$. The teeth $e'$ of the links rest against the bearing-surfaces of the reduced portions $a'$ of the teeth $a$, while the tooth $e$ rests against the central extension $a^2$ of the tooth $a$. I preferably so proportion the bearing-faces $a'$ $a^2$ that while a single tooth $e$ has a full bearing against the tooth of the sprocket-wheel the combined bearing-surface of the two teeth $e'$ is equal to the bearing-surface of the tooth $e$. It will be noticed that the under surface of each side member $b$ of the link is curved to conform to the curve of the wheel. While this is not absolutely necessary, it is preferable, as these side members rest directly over the reduced portions $a'$ of the teeth of the wheel, while the center portions of the teeth of the wheel extend into the open space of the link and hold the chain in line with the wheel, dispensing with the side flanges usually employed in this type of wheel.

I have shown in the drawings the links so proportioned in respect to the sprocket-wheel that two teeth of the sprocket-wheel extend into each open link of the drive-chain. In some instances, however, this proportion may vary, and a single tooth only may extend into the link of the drive-chain or more than two, depending altogether upon the length of the link.

I claim as my invention—

1. The combination of a sprocket-wheel having teeth with reduced portions at each side and a central extension, a chain having a central row of teeth and a row of teeth at each side, the central row of teeth bearing against the central portion of the teeth of the sprocket-wheel and the side teeth bearing against the side portions, substantially as described.

2. The combination of a sprocket-wheel having teeth higher at the center than at the sides, a chain made up of a series of detachable links, each link having side members and an end member, a tooth on the end member and a tooth on each of the side members, the teeth of the side members being in line with the reduced portions of the teeth of the sprocket-wheel and the teeth of the end member being in line with the central portion of the teeth of the sprocket-wheel, substantially as described.

3. The combination of a sprocket-wheel having a series of teeth higher at the center than at the sides, a chain having three series of teeth projecting therefrom, the central teeth of the chain bearing against the central portions of the teeth of the sprocket-wheel and the side series of teeth of the chain bearing against the side portions of the teeth of the sprocket-wheel, the area of bearing of the central teeth being equal to the combined area of the bearing of the side teeth, substantially as described.

In testimony whereof I have signed my name to this specification in the presence of two subscribing witnesses.

FREDERIC V. HETZEL.

Witnesses:
WILL. A. BARR,
JOS. H. KLEIN.